United States Patent [19]
Dureau et al.

[11] Patent Number: 6,118,472
[45] Date of Patent: *Sep. 12, 2000

[54] METHOD AND APPARATUS FOR SEAMLESS CONNECTIVITY OF WIDE-BAND NETWORKS AND NARROW-BAND NETWORKS

[75] Inventors: Vincent Louis Dureau, Menlo Park, Calif.; Regis St. Girons, Fourqueux, France

[73] Assignees: Sun Microsystems, Inc., Palo Alto; OpenTV, Inc., Mountain View, both of Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/658,498

[22] Filed: Jun. 5, 1996

[51] Int. Cl.[7] .................................. H04N 7/10; H04N 7/14
[52] U.S. Cl. .................................. 348/6; 455/3.1; 455/3.2; 455/5.1; 455/6.1; 348/7; 348/12; 348/13; 379/90.01
[58] Field of Search .................................. 348/6, 7, 8, 10, 348/12, 13; 455/3.1, 4.1, 4.2, 5.1, 6.1, 6.2, 3.2; 379/90.01

[56] References Cited

U.S. PATENT DOCUMENTS

| | | | |
|---|---|---|---|
| 5,448,568 | 9/1995 | Delpuch et al. | 348/14 |
| 5,481,542 | 1/1996 | Logston | 348/7 |
| 5,534,913 | 7/1996 | Majeti et al. | 348/7 |
| 5,572,442 | 11/1996 | Schulhof et al. | 348/6 |
| 5,586,121 | 12/1996 | Moura et al. | 348/12 |
| 5,608,447 | 3/1997 | Farry et al. | 348/7 |
| 5,612,730 | 3/1997 | Lewis | 348/13 |
| 5,629,978 | 5/1997 | Blumhardt et al. | 455/4.2 |
| 5,635,918 | 6/1997 | Tett | 340/825.52 |
| 5,640,453 | 6/1997 | Schuchman et al. | 348/12 |
| 5,694,163 | 12/1997 | Harrison | 348/13 |

*Primary Examiner*—John K. Peng
*Assistant Examiner*—Linus H. Lo

[57] ABSTRACT

An apparatus for seamless connectivity between a narrow-band network like the Internet and an interactive TV wide-band network and methods of operating the same support on the fly translation and routing of data between the Internet and the interactive TV wide-band network. The apparatus for interfacing between a wide-band network and a narrow-band network comprises a decoder, having a decoder input, a first decoder port, and a second decoder port, which receives wide-band data from the wide-band network via the second decoder port and decodes the wide-band data to provide decoded data in response to decoder requests from the decoder input. A gateway, coupled to the decoder, the narrow-band network, and the wide-band network having a first gateway port to receive the decoder requests from the first decoder port, a second gateway port to interface with the narrow-band network, and a third gateway port to interface with the wide-band network, retrieves requested data from the narrow-band network in response to the decoder requests and transfers the requested data to the wide-band network for transfer to the decoder.

15 Claims, 3 Drawing Sheets

METHOD AND APPARATUS FOR SEAMLESS CONNECTIVITY OF WIDE-BAND NETWORKS AND NARROW-BAND NETWORKS

BACKGROUND OF THE INVENTION

1. Field of the Invention

The present invention generally relates to interfacing a wide-band network with a narrow-band network and more particularly to transparently interface a unidirectional wide-band broadcast network and the Internet.

2. Description of the Related Arts

Currently, there are two dominant digital infrastructures that are widely accepted and in public use. The first is the Internet structure also known as the world wide web based on narrow-band networks, and the second is Digital Pay television (TV) networks such as DirectTV™ based on wide-band networks.

Being the two dominant digital infrastructures, a single super hybrid infrastructure would provide immense amount of information for its users. Users having access to the single super hybrid infrastructure would have limitless options available. However, no provisions have been made to converge the two infrastructures into a single super hybrid infrastructure. Moreover, considering the properties of each of these networks provides an understanding as to why the two infrastructure are not likely to converge into a single super hybrid infrastructure.

The Internet infrastructure relies on a backbone of limited bandwidth in view of the number of users and services that the Internet infrastructure supports. Users are typically limited to 28.8 kb/s (kilo bits/sec) accessing through telco lines. A fraction of the users are able to upgrade to cable modems capable of Mb/s (mega bits/sec) transfer rates. The terminals used to access the Internet possess high processing power and large amounts of storage. These terminals are commonly referred to as desktop computers. The terminal displays of these desktop computers also possess the ability to produce high quality pictures. In an effort to take advantage of the high processing power of the terminals and reduce bandwidth consumption of the Internet, programming for the Internet relies on large amounts of computer caching available at the terminals and are relying increasingly on distributed processing which downloads a portion of the processing into the terminal to complete the processing for accessing the various world wide web sites.

On the other hand, the wide-band network based Digital Pay TV networks relies on a wide-band broadcast mono-directional network combined with a point to point low bit rate (2400 bits/sec) bi-directional network. The terminals which receive the wide-band broadcast data possess low processing power and little to no storage medium. The displays coupled to the terminals are low quality interlaced displays such as a typical National Television Standards Committee (NTSC) TV found commonly in most households. Thus, the terminals available to the wide-band networks possess low processing power with virtually no storage medium for data and provide low quality displays compared to the Internet terminals.

Further advances based on the Digital Pay TV networks include interactive TV systems. In order to make interactive TV less costly and therefore more attractive to consumer acceptance, it is desirable to keep memory requirements in the receiver to a minimum. Thus, as development for interactive TV systems continues, the trend is to continue building terminals with low processing power and low storage requirements.

Contrary to the trend of maintaining low processing power and minimizing storage requirements, new Internet protocols that are being developed rely more on the processing power of the latest generation computers. Thus, as the Internet technology based on the narrow-band network develops and the interactive TV technology based on the wide-band network technology develops, the Internet technology and the interactive TV technology continues to alienate each other and move apart. Consequently, consumers seeking Internet access that subscribe to interactive TV are forced to acquire the latest generation computer. The cost of having both a subscription to interactive TV and the latest generation computer for Internet access can be cost prohibitive for the consumer. In order for the providers of interactive TV to supply a complete service, a transparent consumer interface between the wide-band network of interactive TV and the narrow-band network for the Internet is needed.

Therefore, it is desirable to provide Internet connectivity to low end terminals operating in an interactive TV wide-band network, and a method of operating the same that support on the fly translation and routing of data between the Internet and the interactive TV wide-band network for transparent access to the Internet.

SUMMARY OF THE INVENTION

The present invention provides an apparatus for seamless connectivity between the Internet and an interactive TV wide-band network and methods of operating the same which support transparent on the fly translation and routing of data between the Internet and the interactive TV wide-band network. The novel seamless connectivity between the networks is based on a gateway that provides the translation and routing of data. Thus, according to one aspect of the invention, a seamless connection for interfacing between a wide-band network and a narrow-band network comprises a decoder, having a decoder input, a first decoder port, and a second decoder port, which receives wide-band data from the wide-band network via the second decoder port and decodes the wide-band data to provide decoded data in response to decoder requests from the decoder input. A gateway, coupled to the decoder, the narrow-band network, and the wide-band network having a first gateway port to receive the decoder requests from the first decoder port, a second gateway port to interface with the narrow-band network, and a third gateway port to interface with the wide-band network, retrieves requested data from the narrow-band network in response to the decoder requests and transfers the requested data to the wide-band network for transfer to the decoder. The decoder receives the requested Internet data from the wide-band network.

According to one aspect of the invention, the seamless connection further comprises a display device having a display input which displays the requested data and wherein the decoder includes a third decoder port coupled to the display input to provide decoded requested data to the display device. Thus, the requested Internet data is displayed on the display device.

According to another aspect of the invention, the first decoder port includes a bi-directional port, and the first gateway port includes a bi-directional port. The gateway includes circuitry which parses the requested data to provide narrow-band data and wide-band data and transfers the narrow-band data for output to the first decoder port. The decoder receives the narrow-band data and decodes the narrow-band data for output to the display device. The gateway transfers the wide-band data to the wide-band network. The decoder receives the wide-band data and recombines the wide-band data with the narrow band data for output to the display device. Thus, criteria may be established to efficiently determine the dynamic routing of the requested data between the wide-band network and the low bit rate network to the decoder. Criteria include the type of the requested Internet data, the availability of bandwidth, size of the Internet data, and added costs associated with transmitting using the wide-band network.

An apparatus and method for seamless connectivity between the Internet and an interactive TV wide-band network are provided. The gateway supports a high performance computer for executing the native protocols of the Internet. The gateway parses the Internet data which enables the low processing power decoders to process the Internet data for display. Thus, lower cost decoders with low processing power can function to provide Internet access.

Other aspects and advantages of the present invention can be seen upon review of the figures, the detailed description, and the claims which follow.

DETAILED DESCRIPTION OF THE INVENTION

The invention will be described with respect to the Figs. in which FIG. 1 generally shows a digital transmission system, as for example a direct broadcast satellite system. It is presumed that a single satellite transponder accommodates a plurality of respective TV programs in time division multiplexed format.

Figure 1:
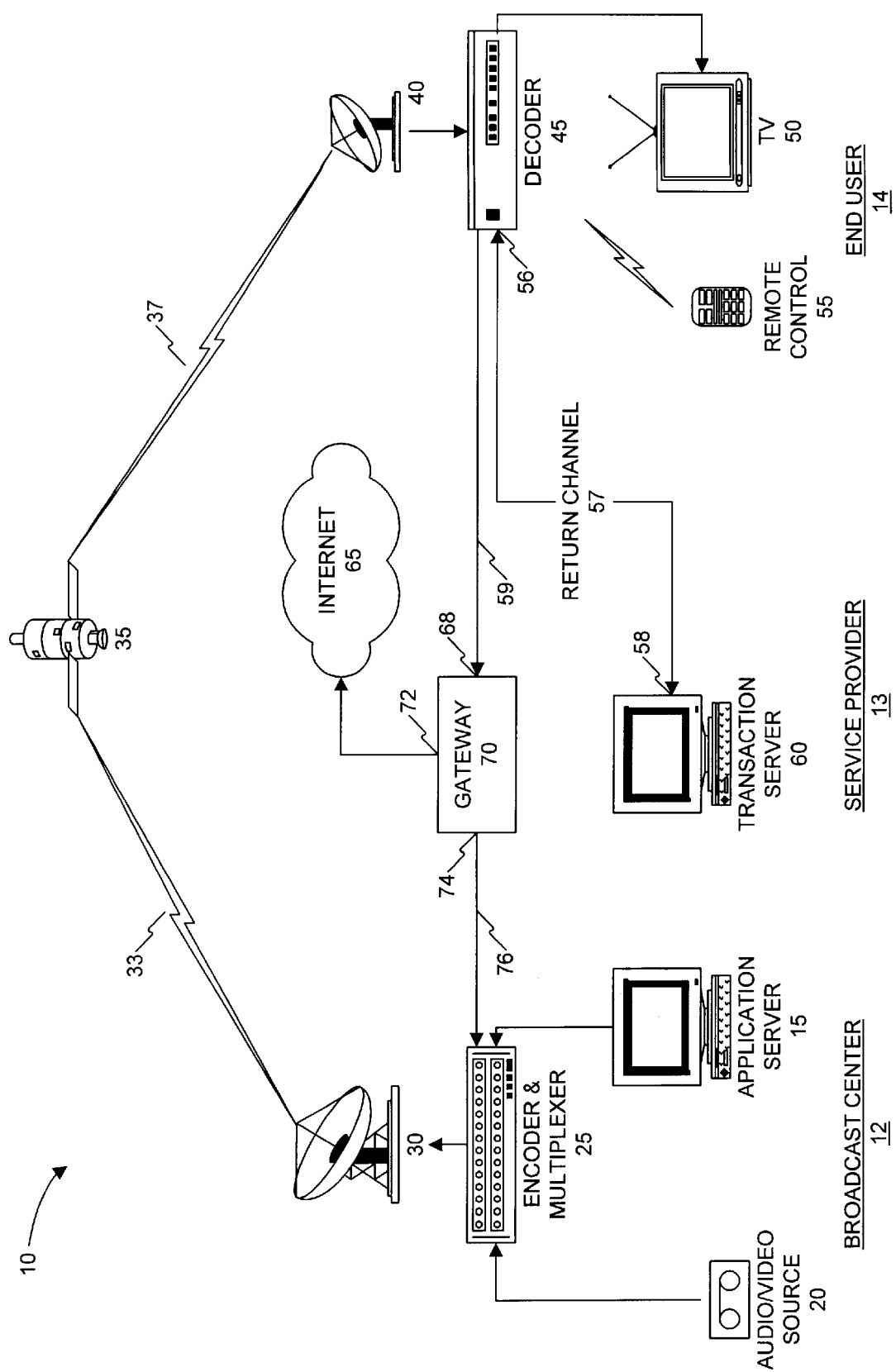
FIG. 1 illustrates a system level block diagram for digital transmissions in a direct broadcast satellite system for a wide-band network.

Referring to FIG. 1, the direct broadcast satellite system 10 provides a wide-band network that includes a broadcast center 12, service provider 13, and an end user 14. The broadcast center 12 includes an application server 15, an audio/video source 20, encoder and multiplexer 25, and satellite transmitter 30. The application server 15 controls execution of interactive TV applications which are loaded into the logic circuits of the application server 15 to perform a series of specifically identified operations dictated by the interactive TV applications.

The interactive TV applications include associated audio and video information sources 20 The application server 15 synchronizes the interactive TV applications and the associated audio and video information sources 20 into transport packets that provide inputs to the encoder and multiplexer 25. The encoder and multiplexer 25 receives the transport packets and encodes the transport packets for transmission. Satellite transmitter 30 time-multiplexes the transport packets and transmits the transport packets as upload signal 33 to satellite 35.

The broadcast center 12 is described in detail in issued U.S. Pat. No. 5,448,568 entitled "System of Transmitting an Interactive TV Signal" assigned to Thomson Consumer Electronics, Inc. issued Sep. 5, 1995. The U.S. Pat. No. 5,448,568 is herein incorporated by reference in its entirety.

Satellite 35 receives the upload signal 33 and transmits download signal 37 to end user 14. The end user 14 includes satellite dish 40, decoder 45, TV 50, remote control 55, return channel 57, and communication channel 59. Satellite dish 40 receives the download signal 37 and provides an output to decoder 45. The decoder 45 includes a software operating system loaded into the logic circuits of the decoder 45 that performs a series of steps to control the operations of the decoder 45. The decoder 45 receives the download signal 37 from satellite dish 40 and decodes the transmitted interactive TV application and its associated audio and video information 20. The decoder 45 executes the interactive TV application and provides audio and video outputs to TV 50.

Remote control 55 provides inputs to the decoder 45 to select execution of other interactive TV applications for output to TV 50. The decoder 45 includes an input/output port 56 that couples to the return channel 57 for communication to transaction server 60 or the communication channel 59 for communication with gateway 70.

The service provider 13 provides local interaction with the end user 14 and includes the transaction server 60 and the gateway 70. The transaction server 60 includes an input/output port 58 which couples to the return channel 57. The transaction server 60 provides monitoring of transactions performed by the end user 14 and updating of the software operating system for the decoder 45 via the return channel 57. The gateway 70 includes a port 68 which receives request for Internet data from decoder 45 via the communication channel 59. The return channel 57 and the communication channel 59 may be telephone lines or cable lines and support a low bit rate link.

The gateway 70 includes a port 72 which provides access to Internet 65. The Internet 65 is a narrow-band network commonly known as the world wide web. The gateway 70 retrieves Internet data from the Internet 65 and communicates the Internet data to port 74 of the gateway 70. High speed line 76 transfers the Internet data to the encoder and multiplexer 25 which encodes the Internet data for broadcast to the wide-band network. Decoder 45 receives the encoded Internet data and decodes the Internet data for display on TV 50.

Figure 2:
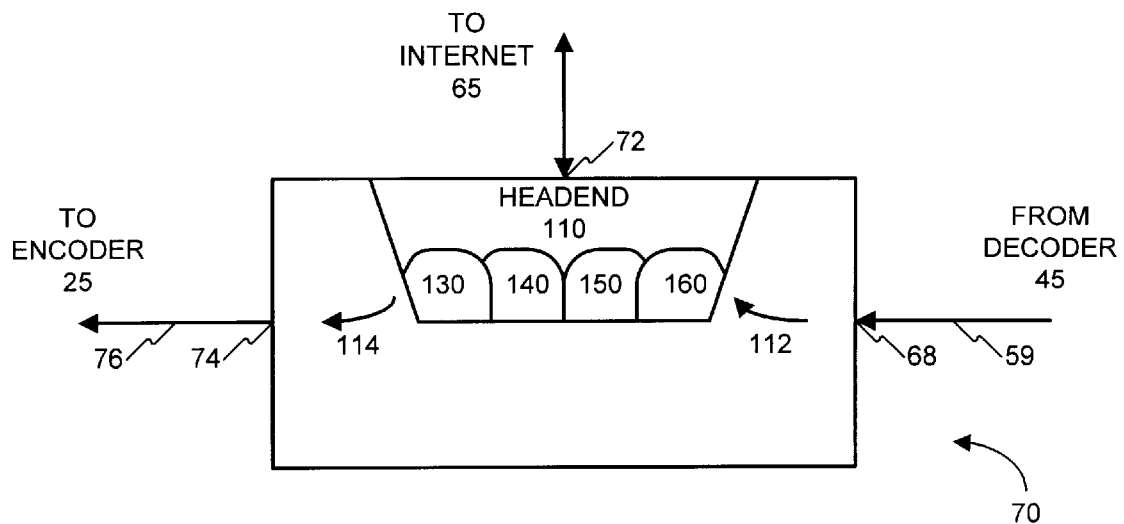
FIG. 2 illustrates a block diagram of an embodiment of a gateway transferring Internet data via the wide-band network according to the present invention.

FIG. 2 illustrates a block diagram of an embodiment of the gateway 70 according to the present invention. The gateway 70 includes a headend 110 that includes circuitry programmed to execute native protocols of the Internet 65. The headend 110 includes an MPEG (Motion Picture Experts Group) encoder 130, renderer 140, cache 150, and parser 160. Port 68 of the gateway 70 receives a data request 112 from decoder 45. Communication channel 59 transfers the data request 112 from the decoder 45 to the port 68. Communication channel 59 is a low bit rate link utilizing telephone lines as the medium for data transfers from the decoder 45 and the gateway 70. The gateway 70 receives the data request 112 for Internet data and forwards the data request 112 to the headend 110.

The headend 110 executes the native protocols for the data request 112 and receives Internet data 114 from the Internet 65. The cache 150 manages latency between the Internet web servers and the headend 110 during retrieval of Internet data 114. The headend 110 transfers the Internet data 114 to port 74 where the high speed line 76 transfers the Internet data 114 to the encoder and multiplexer 25 for encoding. The Internet data 114 includes spatial and temporal correlation encoded data such as rendered MPEG encoded audio and video data. The MPEG encoder 130 and renderer 140 provides the rendered MPEG graphical data. The Internet data 114 is encoded for broadcast by the satellite 30 to the wide-band network. The decoder 45 receives the encoded Internet data and decodes the Internet data for display by TV 50.

Given that the MPEG encoder 130 and render 140 process the Internet data 114, the decoder 45 does not require high processing power to render the graphical data from the Internet data 114. The headend 110 provides a simple and high quality graphical interface to the Internet. Flexibility in MPEG encoding and rendering is also achieved. Moreover, the nature of MPEG encoding takes advantage of changes in relation to static portions of a page. Once the static portions of a page is transferred, later transfers provide data that represent changes to the static portions of the page. Thus, various tradeoffs are considered for the transfer of the MPEG data to the decoder such as fixed quality encoding with variable latency or variable quality with fixed latency. Other tradeoffs include fixed bandwidth verses variable bandwidth allocation of the wide-band link. The tradeoffs are taken into account for minimizing the processing of Internet data for the decoder 45.

Figure 3:
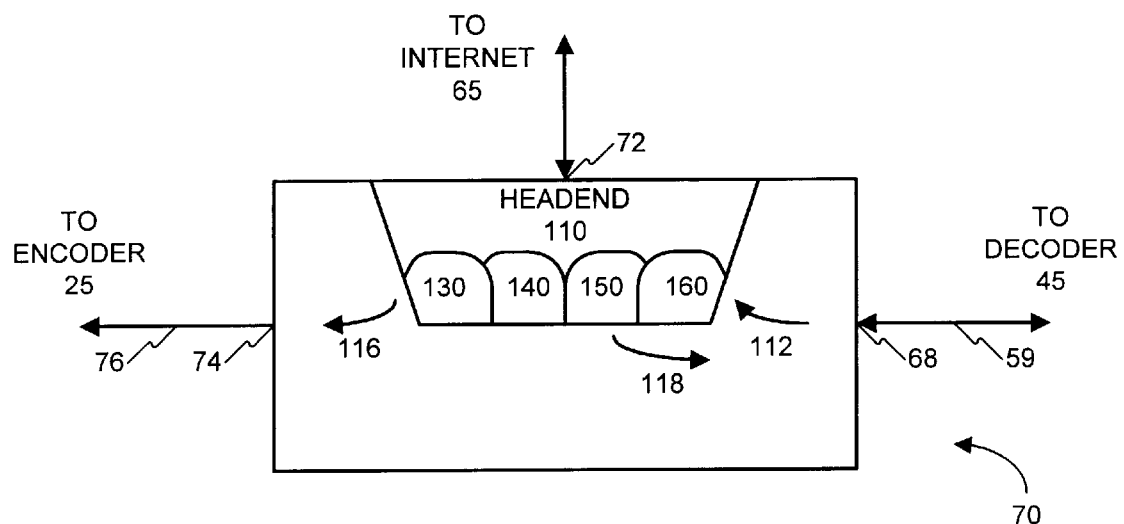
FIG. 3 illustrates a block diagram of another embodiment of the gateway transferring Internet data via the wide-band network and the communication channel according to the present invention.

FIG. 3 illustrates a block diagram of another embodiment of the gateway 70. The gateway 70 includes a headend 110 that includes circuitry programmed to execute native protocols of the Internet 65. Port 68 of the gateway 70 receives a data request 112 from decoder 45. Communication channel 59 transfers the data request 112 from the decoder 45 to the port 68. Communication channel 59 is a low bit rate link utilizing telephone lines as the medium for data transfers between the decoder 45 and the gateway 70. The gateway 70 receives the data request 112 for Internet data and forwards the data request 112 to the headend 110.

The headend 110 executes the native protocols for the data request 112 and receives Internet data 114 from the Internet 65. The parser 160 parses the Internet data 114 into wide-bard data and narrow-band data such as graphical data and textual data. The headend 110 determines routing of the parsed Internet data between the wide-band links and the narrow-band links based on criteria such as cost, availability of bandwidth, size of data, and type of data. For example, small sized data may be transferred using the slower low bit rate link. Real time data on the other hand such as video or audio data are transferred using the faster wide-band network.

Referring to FIG. 3, the gateway 70 receives the wide-band Internet data 116 and transfers the wide-band Internet data 116 to port 74 where the high speed line 76 transfers the wide-band Internet data 116 to the encoder and multiplexer 25 for encoding. After encoding the wide-band Internet data 116, satellite 30 broadcasts the encoded Internet data to the wide-band network. The gateway 70, in response to the narrow-band data 118, transfers the narrow-band Internet data 118 to port 68 where the communication channel 59 transfers the narrow-band Internet data 118 to the decoder 45. The decoder 45 receives the encoded wide-bard Internet data 116 from the wide-band network and the narrow-band Internet data on communication channel 59. 25 After decoding the encoded wide-band Internet data 116, the decoder 45 includes circuitry which recombines the wide-band Internet data 116 with the narrow-band Internet data 118 to provide display data for display by TV 50.

The decoder 45 includes circuitry that renders the graphical data for display by TV 50. Bandwidth consumption of the wide-band network is reduced by parsing the internet data to provide graphical data and textual data and using the narrow-band network to transfer the parsed internet data.

Figure 4:
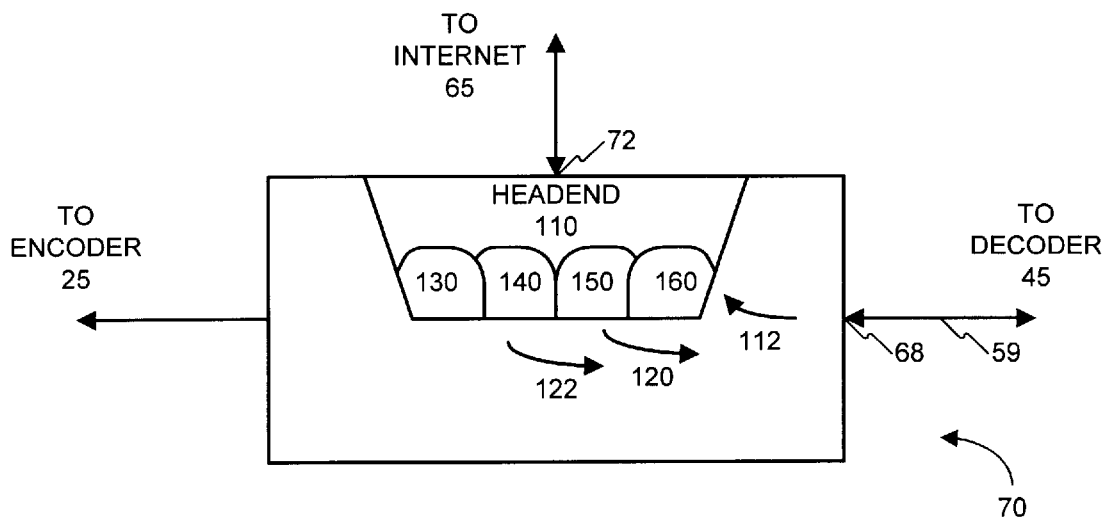
FIG. 4 illustrates a block diagram of another embodiment of the gateway transferring Internet data via the communication channel according to the present invention.

FIG. 4 illustrates another embodiment of the gateway 70 according to the present invention. As decoder 45 receives a request to access the Internet 65, the decoder tunes to a specific channel on the wide-band network and downloads an interactive TV application associated with Internet access. The interactive TV application includes an Internet web browser similar to the Netscape Navigator™ developed by Netscape Communications Corporation and instruction codes that programs circuitry within the decoder 45 to establish the communication channel 59 to contact the gateway 70. Thus, the decoder 45 includes additional circuitry for increased processing power that enables execution of a world wide web browser at the decoder 45.

As the decoder 45 receives inputs for Internet requests 112, the Internet requests 112 are transferred to port 68 of the gateway 70 via the established communication channel 59. The gateway 70 transfers the Internet requests 112 to the headend 110. The headend 110 includes circuitry programmed to retrieve the requested Internet data. Once the requested Internet data is retrieved, the headend 110 parses the Internet data to provide text 120 and control devices 122 for the particular web page. The control devices 122 include functional buttons and scrolling functions for the web page.

The gateway 70 transfers the text 120 and the control devices 122 to the decoder 45 via communication channel 59. The text 120 and the control 25 devices 122 provide inputs to the Internet web browser which enables the decoder 45 to reconstruct the requested Internet data. As the decoder 45 request additional web pages, the headend 110 transfers additional text 120 and control devices 122 associated with the additional web pages via the communication channel 59. Thus, as the decoder possesses more processing power, the amount of data and the rate of transfer for the data to support Internet browsing is reduced.

Figure 5:
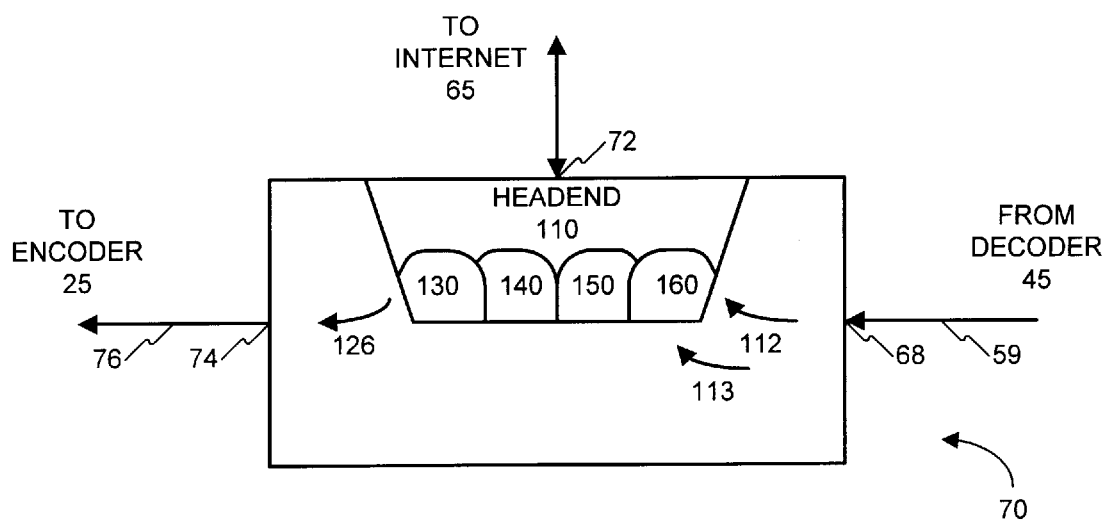
FIG. 5 illustrates a block diagram of another embodiment of the gateway transferring a plurality of Internet data for repeated broadcasts via the wide-band network according to the present invention.

FIG. 5 illustrates another embodiment of the gateway 70 according to the present invention. During instances when requests for access to the Internet 65 are abundant, certain web pages on the Internet 65 are more popular and are repeatedly requested. The headend 110 includes the cache 150 and circuitry programmed to statistically monitor and store repeated retrievals of the more popular web pages from the Internet 65. Data from the statistical monitoring establish controls for rebroadcasting the more popular web pages to the wide-band network. Rebroadcasting the more popular web pages enables faster responses to decoders 45 that request those web pages.

For example, Internet requests 112 and 113 request similar Internet data and are received at port 68 via Communication channel 59 from a plurality of decoders 45. The gateway 70 forwards the Internet requests 112 and 113 to the headend 110. The headend 110 retrieves the requested Internet data 126 and determines that the Internet data is frequently requested and notifies the headend 110. As the headend 110 transfers the requested Internet data 126 to port 74 for transfer to the encoder 25 via the high speed line 76, the encoder 25 is also notified that the requested Internet data 126 is to be rebroadcasted. The encoder 25 encodes the requested. Internet data 126 for broadcast by the satellite 30 and notifies the satellite to repeatedly broadcast the encoded internet data. The satellite 30, in response to the notification, rebroadcasts the requested Internet data 125 received from cache 150 at regular intervals. Increased decoder response is achieved by having the popular web pages stored in cache 150 and regularly broadcasted rather than having each individual decoder submit requests to the gateway 70 to retrieve the same popular web pages.

In a further embodiment of the invention, the decoder 45 includes circuitry programmed to select particular web pages that have been requested from the repeated broadcasts of the popular web pages. The other web pages received from the wide-band network are filtered and ignored by the decoder 45. Thus, the decoder 45 is programmed to select from the popular web pages broadcasted onto the wide-ban(i network those web pages that the decoder 45 had requested. Rebroadcasting the popular web pages enables the gateway 70 to operate at higher efficiency by avoiding repeated accesses to Internet 65. Furthermore, latency associated with accessing the Internet 65 is reduced by having the popular web pages readily download able from the wide-band network. Depending on the traffic for accessing particular web pages, latency associated with accessing the particular web pages can be of long duration. Thus, repeated broadcasts of popular web pages from the Internet 65 increases response time to the decoder 45 when accessing the Internet.

Accordingly, an apparatus for seamless connectivity of wide-band networks and narrow-band networks has been provided. The gateway provides an interface between the wide-band network and the narrow-band network. Accessing the Internet which resides on the narrow-band network from the wide-band network base is transparent to the users of the decoder on the wide-band network. Depending on the type of Internet data and the sophistication of the circuitry of the decoder, the Internet data is transferred over the wide-band network or the low bit rate communication channel of the decoder or a combination of both. Although the embodiments for seamless connectivity of wide-band networks and narrow-band networks have been disclosed with reference to an interactive TV system operating in a satellite transceiving network and the Internet, variations of the seamless connectivity interface according to the present invention are applicable in other network applications.

The foregoing description of a preferred embodiment of the invention has been presented for purposes of illustration and description. It is not intended to be exhaustive or to limit the invention to the precise forms disclosed. Obviously, many modifications and variations will be apparent to the practitioners skilled in the art. It is intended that the scope of the invention be defined by the following claims and their equivalents.

What is claimed is:

1. A seamless connection for interfacing between a wide-band network and a narrow-band network comprising:

a decoder, having a decoder input, a first decoder port, and a second decoder port, which receives wide-band data from the wide-band network via the second decoder port and decodes the wide-band data to provide decoded data in response to decoder requests from the decoder input;

a gateway, coupled to the the coder, the narrow-band network, and the wide-band network having a first gateway port to receive the decoder requests from the first decoder port, a second gateway port to interface with the narrow-band network, and a third gateway port to interface with the wide-band network, which retrieves requested data from the narrow-band network in response to the decoder requests and transfers the requested data to the wide-band network for transfer to the decoder; and a display device having a display input which displays the requested data and wherein the decoder includes a third decoder port coupled to the display input to provide decoded requested data to the display device;

wherein:
the first decoder port includes a bi-directional port;
the first gateway port includes a bi-directional port;
the gateway includes circuitry which parses the requested data to provide narrow-band data and wide-band data and transfers the narrow-band data to the first gateway port for output; and
the decoder receives the narrow-band data via the first decoder port.

2. The seamless connection according to claim 1, wherein:

the gateway transfers the wide-band data to the wide-band network; and the decoder receives the wide-band data and recombines the wide-band data with the narrow band data for output to the display device.

3. A seamless connection for interfacing between a wide-band network and a narrow-band network comprising:

a decoder, having a decoder input, a first decoder port, and a second decoder port, which receives wide-band data from the wide-band network via the second decoder port and decodes the wide-band data to provide decoded data in response to decoder requests from the decoder input;

a gateway, coupled to the decoder, the narrow-band network, and the wide-band network having a first gateway port to receive the decoder requests from the first decoder port, a second gateway port to interface with the narrow-band network, and a third gateway port to interface with the wide-band network, which retrieves requested data from the narrow-band network in response to the decoder requests and transfers the requested data to the wide-band network for transfer to the decoder; and a display device having a display input which displays the requested data and wherein the decoder includes a third decoder port coupled to the display input to provide decoded requested data to the display device;

wherein the decoder includes circuitry programmable to execute specified functions receives a browser application from the wide-band network which programs the circuitry in the decoder to receive parsed Internet data from the narrow-band network for output to the display device.

4. The seamless connection according to claim 3, wherein the gateway receives Internet data pertaining to a particular web page and parses the web page to provide the parsed Internet data for transfer to the decoder.

5. The seamless connection according to claim 4, wherein the parsed Internet data includes text and control devices to reconstruct the particular web page.

6. A connection system for a wide-band broadcast network for accessing a narrow-band network to provide Internet access comprising:

a wide-band receiver, coupled to the wide-band network, which receives broadcasts of encoded wide-band broadcast data from the wide-band network;

a decoder, coupled to the wide-band broadcast network having a first decoder input, a second decoder input, a first decoder port, and a second decoder port, responsive to decoder control signals applied to the first decoder input provides decoder requests to the first decoder port and decodes wide-band data received from the second decoder input to provide display data to the second decoder port;

a gateway, coupled to the decoder and the narrow-band network having a first gateway port to receive the decoder requests, a second gateway port to transceive Internet data, and a third gateway port, which retrieves requested Internet data from the narrow-band network in response to the decoder requests and transfers the requested Internet data to the third gateway port;

an encoder, coupled to the third gateway port having an encoder input to receive the requested Internet data and an encoder output, which encodes the requested Internet data and provides the encoded wide-band broadcast data to the encoder output;

a wide-band transmitter, coupled to the wide-band network and the encoder output, which broadcasts the encoded wide-band broadcast data to the wide-band network; and a display coupled to the second decoder port which receives the display data and provides an visual image in response to the display data;

wherein:
the gateway includes circuitry which parses the requested Internet data to provide narrow-band data and wide-band data and transfers the narrow-band data for output to the first decoder port and the wide-band data to the encoder input; and
the decoder receives the narrow-band data and the encoded wide-band broadcast data and includes circuitry which recombines the narrow-band data and the encoded wide-band broadcast data to provide display data to the second decoder port.

7. A connection system for a wide-band broadcast network for accessing a narrow-band network to provide Internet access comprising:

a wide-band receiver, coupled to the wide-band network, which receives broadcasts of encoded wide-band broadcast data from the wide-band network;

a decoder, coupled to the wide-band broadcast network having a first decoder input, a second decoder input, a first decoder port, and a second decoder port, responsive to decoder control signals applied to the first decoder input provides decoder requests to the first decoder port and decodes wide-band data received from the second decoder input to provide display data to the second decoder port;

a gateway, coupled to the decoder and the narrow-band network having a first gateway port to receive the decoder requests, a second gateway port to transceive Internet data, and a third gateway port, which retrieves requested Internet data from the narrow-band network in response to the decoder requests and transfers the requested Internet data to the third gateway port;

an encoder, coupled to the third gateway port having an encoder input to receive the requested Internet data and an encoder output, which encodes the requested Internet data and provides the encoded wide-band broadcast data to the encoder output;

a wide-band transmitter, coupled to the wide-band network and the encoder output, which broadcasts the encoded wide-band broadcast data to the wide-band network; and a display coupled to the second decoder port which receives the display data and provides an visual image in response to the display data;

wherein:
the decoder includes circuitry programmable to execute specified functions receives a browser application from the wide-band network which programs circuitry in the decoder to receive parsed Internet data from the narrow-band network for output to the display device.

8. The connection system according to claim 7, wherein the gateway includes circuitry which provides internet browsing to retrieve the requested Internet data from the narrow-band network and parse the requested Internet data to provide the parsed Internet data to the decoder.

9. The connection system according to claim 8, wherein the gateway requested Internet data includes a particular web page and the parsed Internet data includes text and control devices to reconstruct the particular web page.

10. A connection system for a wide-band broadcast network for accessing a narrow-band network to provide Internet access comprising:

a wide-band receiver, coupled to the wide-band network, which receives broadcasts of encoded wide-band broadcast data from the wide-band network;

a decoder, coupled to the wide-band broadcast network having a first decoder input, a second decoder input, a first decoder port, and a second decoder port, responsive to decoder control signals applied to the first decoder input provides decoder requests to the first decoder port and decodes wide-band data received from the second decoder input to provide display data to the second decoder port;

a gateway, coupled to the decoder and the narrow-band network having a first gateway port to receive the decoder requests, a second gateway port to transceive Internet data, and a third gateway port, which retrieves requested Internet data from the narrow-band network in response to the decoder requests and transfers the requested Internet data to the third gateway port;

an encoder, coupled to the third gateway port having an encoder input to receive the requested Internet data and an encoder output, which encodes the requested Internet data and provides the encoded wide-band broadcast data to the encoder output;

a wide-band transmitter, coupled to the wide-band network and the encoder output, which broadcasts the encoded wide-band broadcast data to the wide-band network; and a display coupled to the second decoder port which receives the display data and provides an visual image in response to the display data;

wherein:
the gateway retrieves a plurality of web pages from the narrow-band network and transfers the plurality of web pages to the encoder;
the encoder encodes the plurality of web pages and provides encoded wide-band web page broadcast data to the wide-band transmitter; and
the wide-band transmitter transmits the wide-band web page broadcast data to the wide-band network.

11. The connection system according to claim 10, wherein the decoder includes circuitry programmed to select particular web pages from the wide-band web page broadcast data for decoding to provide display data for output.

12. A method of seamless connectivity on a hybrid network for interfacing between a wide-band network and a narrow-band network comprising the steps:

interfacing to the narrow-band network to retrieve narrow-band data in response to decoder requests;

encoding the narrow-band data for transfer to the wide-band network;

decoding wide-band data from the wide-band network to provide display data; and parsing the narrow-band data to provide low bit rate data and wide-band data.

13. A method of seamless connectivity on a hybrid network for interfacing between a wide-band network and a narrow-band network comprising the steps:

interfacing to the narrow-band network to retrieve narrow-band data in response to decoder requests;

encoding the narrow-band data for transfer to the wide-band network;

decoding wide-band data from the wide-band network to provide display data;

parsing the narrow-band data to provide low bit rate data and wide-band data;

transferring the low bit rate data to a low bit rate link;

receiving the low bit rate data from the low bit rate link; and recombining the low bit rate data with the wide-band data to provide the display data.

14. A method of seamless connectivity on a hybrid network for interfacing between a wide-band network and a narrow-band network comprising the steps:

interfacing to the narrow-band network to retrieve narrow-band data in response to decoder requests;

encoding the narrow-band data for transfer to the wide-band network;

decoding wide-band data from the wide-band network to provide display data;

parsing the narrow-band data to provide low bit rate data and wide-band data;

downloading a client browser application from the wide-band network;

parsing the narrow-band data to provide low bit rate data to the client browser application; and processing the low bit rate data to provide the display data.

15. The method of seamless connectivity according to claim 14, wherein:

the low bit rate data includes image rectangles representing optional wide-band data;

transferring the optional wide-band data to the wide-band network; and recombining the optional wide-band data with the low bit rate data of the client browser application to display the optional wide-band data in response to a decoder request.

* * * * *

UNITED STATES PATENT AND TRADEMARK OFFICE
CERTIFICATE OF CORRECTION

PATENT NO : 6,118,472

DATED : Sep. 12, 2000

INVENTOR(S): Dureau, et al.

It is certified that an error appears in the above-identified patent and that said Letters Patent are hereby corrected as shown below:

In claim 1 (at column 7, line 61), replace "the the coder" with --the decoder--.

Signed and Sealed this

Twenty-fourth Day of April, 2001

Attest:

NICHOLAS P. GODICI

Attesting Officer     *Acting Director of the United States Patent and Trademark Office*